United States Patent
Courtier et al.

(10) Patent No.: US 11,933,194 B2
(45) Date of Patent: Mar. 19, 2024

(54) FAN OR PROPELLER VANE FOR AN AIRCRAFT TURBOMACHINE AND METHOD FOR MANUFACTURING SAME

(71) Applicant: SAFRAN AIRCRAFT ENGINES, Paris (FR)

(72) Inventors: Vivien Mickael Courtier, Moissy-Cramayel (FR); Teddy Fixy, Moissy-Cramayel (FR); Clement Pierre Postec, Moissy-Cramayel (FR); Eddy Keomorakott Souryavongsa, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/757,348

(22) PCT Filed: Dec. 17, 2020

(86) PCT No.: PCT/FR2020/052514
§ 371 (c)(1),
(2) Date: Jun. 14, 2022

(87) PCT Pub. No.: WO2021/123652
PCT Pub. Date: Jun. 24, 2021

(65) Prior Publication Data
US 2023/0010778 A1     Jan. 12, 2023

(30) Foreign Application Priority Data
Dec. 20, 2019   (FR) .................................... 1915318

(51) Int. Cl.
*F01D 5/28*   (2006.01)
*B29C 70/24*  (2006.01)
(Continued)

(52) U.S. Cl.
CPC .............. *F01D 5/282* (2013.01); *B29C 70/24* (2013.01); *B29C 70/48* (2013.01); *F01D 5/147* (2013.01);
(Continued)

(58) Field of Classification Search
CPC ................................ F01D 5/282; B29C 70/24
See application file for complete search history.

(56) References Cited

U.S. PATENT DOCUMENTS 6,572,335 B2 * 6/2003 Kuwabara ............... F01D 5/187
416/96 A
7,101,154 B2 * 9/2006 Dambrine ............... B29C 70/48
442/205
(Continued)

FOREIGN PATENT DOCUMENTS

EP    1526285 A1   4/2005
EP    2500263 A2   9/2012
(Continued)

OTHER PUBLICATIONS

International Search Report received for PCT Patent Application No. PCT/FR2020/052514, dated Apr. 9, 2021, 6 pages (2 pages of English Translation and 4 pages of Original Document).

*Primary Examiner* — Michael L Sehn
(74) *Attorney, Agent, or Firm* — WOMBLE BOND DICKINSON (US) LLP

(57) ABSTRACT

Fan or propeller vane (1) for an aircraft turbomachine, the vane being made from a composite material and comprising a blade (2) and a base (3), the base being formed by a longitudinal end (41) of a spar (4) which is formed by a fibrous reinforcement formed from threads woven in three dimensions and a portion (42) of which extends inside the blade (2), the blade (2) having an aerodynamic profile which is defined by a skin (5) which is formed by woven threads and which surrounds the portion of the spar, the spar (4) and
(Continued)

the skin (5) being embedded in a polymerised resin, characterised in that the portion (42) of the spar comprises projecting longitudinal stiffening members (6) which together delimit spaces (8) for receiving longitudinal inserts (7) which are formed from a honeycomb material.

20 Claims, 5 Drawing Sheets

(51) Int. Cl.
*B29C 70/48* (2006.01)
*F01D 5/14* (2006.01)
*B29L 31/08* (2006.01)

(52) U.S. Cl.
CPC . *B29L 2031/082* (2013.01); *F05D 2300/6012* (2013.01); *F05D 2300/603* (2013.01)

(56) References Cited

U.S. PATENT DOCUMENTS

| | | | | |
|---|---|---|---|---|
| 9,850,767 | B2* | 12/2017 | Guo | F01D 5/288 |
| 9,957,972 | B2* | 5/2018 | Foster | F01D 5/282 |
| 10,145,039 | B2* | 12/2018 | Marchal | B29D 22/00 |
| 2013/0039774 | A1 | 2/2013 | Viens et al. | |

FOREIGN PATENT DOCUMENTS

| | | |
|---|---|---|
| WO | 2006/136755 A2 | 12/2006 |
| WO | 2013/160584 A1 | 10/2013 |
| WO | 2015/034630 A1 | 3/2015 |

* cited by examiner

FAN OR PROPELLER VANE FOR AN AIRCRAFT TURBOMACHINE AND METHOD FOR MANUFACTURING SAME

TECHNICAL FIELD OF THE INVENTION

The present invention relates to the technical field of aircraft turbomachines, such as turbojet or a turboprop engine. More particularly, the present invention relates to a propeller fan vane for a turbomachine and a method for manufacturing the same.

TECHNICAL BACKGROUND

The prior art comprises in particular the documents US-A1-2013/039774 and EP-A2-2500263.

In a known way, in the hypothesis of a shrouded architecture, an aircraft turbomachine comprises from upstream to downstream, in the direction of gases flow, a fan, a low-pressure compressor, a high-pressure compressor, a combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

A turbomachine comprises rotor vanes that rotate inside casings. This is for example the case of the fan vanes of a turbomachine which are surrounded by a retention casing. Such a vane typically comprises a root and a blade, the root comprising lateral faces connected to the blade and intended to form bearing surfaces in a mounting housing of a rotor disc.

Such a vane is designed with a good mechanical strength and reducing the noise emitted by the vane during operation, in order to optimize the aerodynamic performance of the turbomachine.

In general, to improve the aerodynamic performance of, for example, a fan module and its vanes, the bypass ratio (BPR) of the turbomachine is increased. This leads to an increase in the external diameter of the vanes and the span of the vanes. This large sizing can lower some own modes of these vanes, in particular the own frequency of the vanes in bending. The own modes of these vanes can be enhanced by greatly increasing the thickness of the walls forming the vane. However, this can considerably increase the weight of the vane and in general the dimension of the turbomachine.

In a similar way, this demonstration on the sizing in thickness of the fan remains valid in the case of shrouded architectures (fan vane) or not shrouded (propeller vane), architectures with or without mechanical reducer, or configurations type "puller" (in which the propeller vane is placed at the front of the turbomachine) or type "pusher" (in which the propeller vane is placed at the back of the turbomachine).

Generally, the external surface of the blade (or otherwise referred to as a skin) of the high-chord vane works mechanically more than the central portion of the blade. Thus, it can be envisaged to produce a vane referred to as "hollow" whose central portion of the blade can be made of lighter material (for example foam), so as to optimize the total mass of the vane. However, this central portion does not have any structural rigidity, and under extreme operating conditions (e.g. an ingestion of solid particles), the integrity of the vane may be seriously affected.

The present invention proposes a simple, effective and economical solution to this problem.

SUMMARY OF THE INVENTION

The invention proposes a fan or propeller vane for an aircraft turbomachine, the vane being made from composite material and comprising a blade and a root, the root being formed by a longitudinal end of a spar which is formed by a fibrous reinforcement formed of three-dimensionally woven threads and a portion of which extends inside the blade, said blade having an aerodynamic profile defined by a skin formed by woven threads and surrounding said portion of the spar, the spar and the skin being embedded in a polymerized resin. Said portion of the spar comprises protruding longitudinal stiffeners which delimit between them spaces for housing longitudinal inserts formed from a cellular material.

The longitudinal stiffeners of the invention, being made of woven threads similar to the blade skin with aerodynamic profile, allow to ensure an efficient and homogeneous transmission of forces between the skin and the spar without any concentration area of constraints or deformation. Thus, the vane of the invention, in particular with a large chord, has both a lighter overall mass, due to the presence of longitudinal inserts made of cellular material, and a mechanical strength reinforced by the presence of longitudinal stiffeners made of composite material (fibrous reinforcement densified by a resin). Indeed, the rigidity of the vane is reinforced against shocks or impacts, to resist the efforts of a bird ingestion for example.

The vane according to the invention may comprise one or more of the following characteristics, taken alone or in combination with each other:
- each of the stiffeners is formed by an unbinding of threads of the spar; indeed, after each unbindings, in particular of the warp threads of the spar, an increase in the weaving thickness of the weft threads is produced in order to form an overthickness at the level of this unbinding. Each unbinding and overthickness allows to form a 3D woven stiffener.
- the transverse thickness of the spar decreases from the root towards the opposite end of the spar;
- the skin comprises an unbinding separating at least partially intrados and extrados walls of the blade, in particular at the level of a trailing edge of the skin;
- the stiffeners are arranged on an intrados face or an extrados face of the portion of the spar;
- the spar comprises between two and twelve stiffeners spaced from each other;
- each stiffener has a variable thickness, in particular between 2 and 5 mm;
- the end forming the root extends outside the skin;
- the vane comprises a protective element on one of the edges of the blade, such as a thermoplastic polyurethane film;
- the cellular material of the longitudinal inserts is selected from a polymeric foam of the Rohacell® type, an aluminium foam, a metal honeycomb and/or a polymer of the Nomex® type.

The invention also relates to a method for manufacturing a vane according to one embodiment of the invention, the method comprising the steps of:
a) producing a first fibrous preform, referred to as "spar preform", by three-dimensional weaving of threads; said spar preform comprising both a longitudinal end configured to form a vane root and a portion configured to be inserted inside a vane blade;

b) producing a second fibrous preform, referred to as "skin preform", by three-dimensional weaving or braiding of threads, said skin preform being configured to form an aerodynamic profile;

e) arranging the spar preform inside the skin preform;

f) positioning said preforms in a mould, then injecting a thermosetting resin to obtain the vane.

In accordance with the invention, the method comprises, prior to the steps e) and f), the steps consisting in:

a2) forming in the step a) a plurality of longitudinal stiffeners on said portion of the spar, and delimiting spaces between said stiffeners, c) producing longitudinal inserts of cellular material;

d) inserting said inserts into said corresponding spaces of the spar preform.

Advantageously, in the step a2) said stiffeners are formed by unbindings of warp threads and by increases of weft threads at the level of said thread unbindings.

Preferably, after the step f), the method comprises a step g) of trimming the vane to form its final outline and/or a step h) of bonding a reinforcement to one of the edges of the blade to form a trailing edge and/or a leading edge of the vane.

In particular, the step b) of the method comprises a sub-step b2) producing an unbinding of the warp threads, such as at the level of the side of a trailing edge of the skin preform.

BRIEF DESCRIPTION OF THE FIGURES

The invention will be better understood and other details, characteristics and advantages of the present invention will become clearer from the following description made by way of non-limiting example and with reference to the attached drawings, in which.

Figure 1:
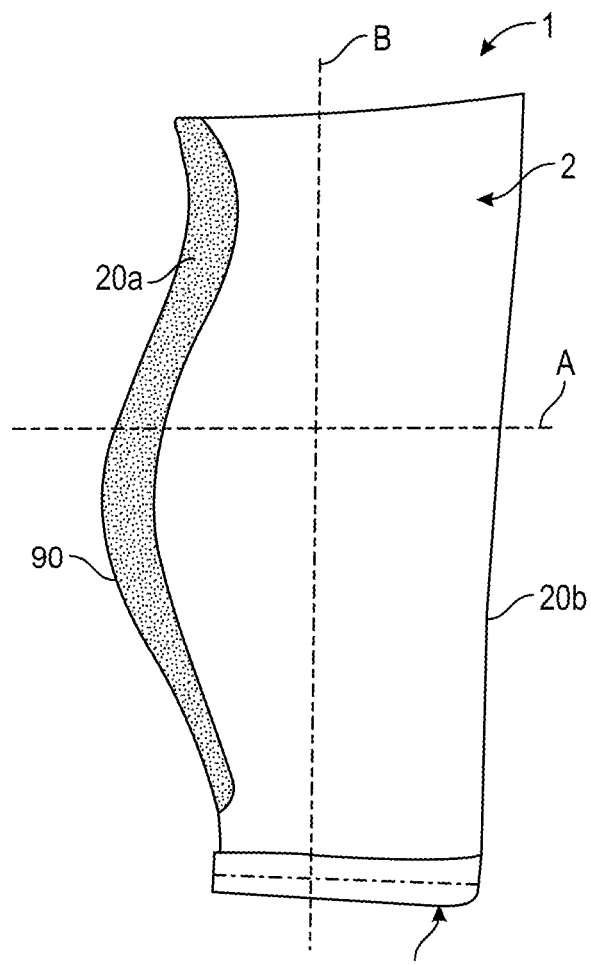
FIG. 1 is a schematic front view of a fan vane according to the invention.

In the figures of the present application, the term "longitudinal" defines an extension in the direction of the axis or the plane B FIG. 1. The term "axial" defines an extension in the direction of the axis or plane A FIG. 1. The term "transverse" defines an extension in the direction orthogonal to the axis A and the axis B FIG. 1.

DETAILED DESCRIPTION OF THE INVENTION

The invention is generally applicable to different types of fan or propeller vane used in aircraft turbomachines, such as an aircraft turbojet or turboprop engine. The invention has an advantageous, but not exclusive, application in large vane which, due to their size, have a large mass that has a significant impact on the overall mass of the turbomachine.

In a classical way, in the hypothesis of a shrouded architecture, a turbomachine comprises from upstream to downstream, i.e. in the direction of flow of the gas flows, a fan, one or more compressors, a combustion chamber, one or more turbines, and a nozzle for the ejection of the combustion gases leaving the turbine or the turbines.

FIG. 1 shows a fan vane 1 intended to be mounted on a turbomachine which comprises a blade 2 having a structure with aerodynamic profile intended to form the aerodynamic portion of the vane, a root 3 formed by a portion of greater thickness, for example with a cross-section shaped like a bulbous. The aerodynamic profile blade 2 has a curved profile of variable thickness along an axis A between its leading edge 20a and its trailing edge 20b.

Figure 2:
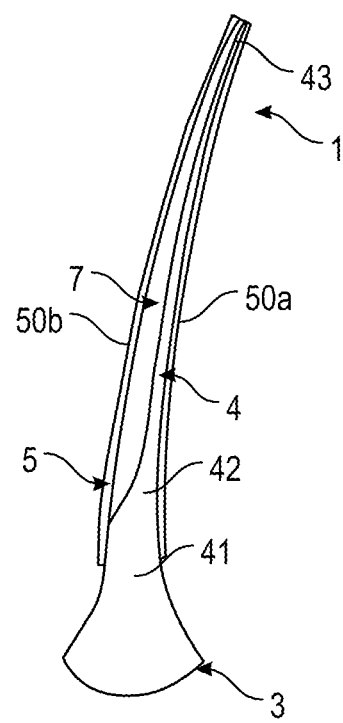
FIG. 2 is a schematic cross-sectional view along a vertical plane B of the vane of FIG. 1.

As shown in FIG. 2, the blade 2 comprises an intrados wall 50a and an extrados wall 50b, these two walls 50a, 50b forming an external skin 5 of the vane. Such a blade skin 5 may be formed of woven filaments impregnated with a thermosetting resin. A protective element 90 may be added in the region of the leading edge 20a and/or the trailing edge 20b of the blade. The protective element 90 may be a thermoplastic polyurethane film.

Furthermore, these walls 50a, 50b are spaced apart from each other by a spar 4. The spar 4 comprises a longitudinal end 41 extending outside the skin 5 and forming the vane root 3, and a portion 42 arranged inside the blade skin 5. The thickness of the spar 4 may decrease from the end 41 of the root towards an opposite end 43 of the spar (i.e. in the direction of the span of the vane). This thickness is measured in a transverse direction (when the stiffeners are not unfolded) with respect to the longitudinal axis B of the vane (FIG. 1). This end 43 is arranged at the summit of the vane blade 2. Such a spar can be obtained by a fibrous preform made of three-dimensional (3D) woven threads. Similarly, the skin 5 can be obtained by three-dimensional woven threads.

One of the particularities of the invention lies in the fact that the portion 42 of the spar comprises substantially longitudinal projecting stiffeners 6 which delimit between them spaces 8 for housing longitudinal inserts 7.

Figure 3A:
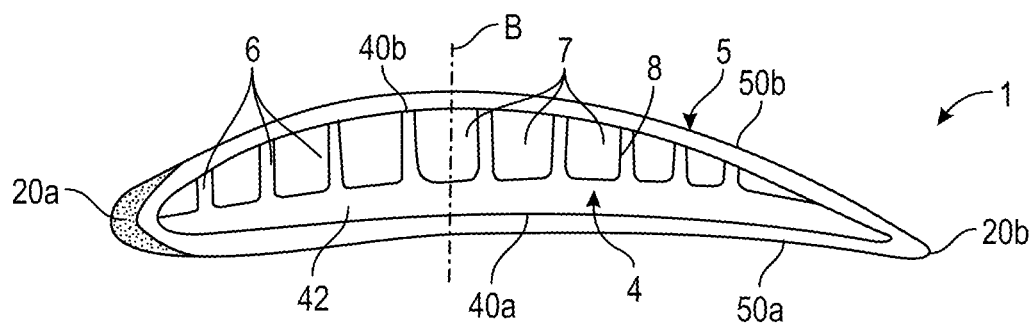
FIG. 3A is a schematic view in axial cross-section along a horizontal plane A of the vane of FIG. 1 comprising stiffeners according to a first embodiment.
Figure 3B:
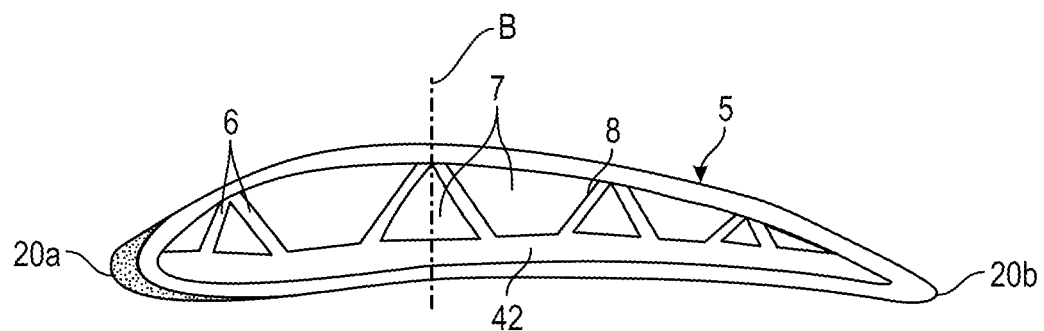
FIG. 3B is a schematic axial cross-sectional view along the plane A of the vane of FIG. 1 comprising stiffeners according to a second embodiment.

FIGS. 3A and 3B illustrate two non-limiting examples of inserts 6 assembled in the housing spaces 8 formed between the stiffeners 6 of the spar. The spaces 8 for housing the vane can have different geometric shapes depending on the arrangement of the stiffeners 6 inside the blade. The stiffeners 6 in FIG. 3A extend substantially parallel to the axis B. The stiffeners in FIG. 3B are inclined, so as to form spaces 8 of triangular and trapezoidal shape in axial cross-section.

In the examples, the stiffeners 6 are arranged on an intrados face 40a of the spar 4. Alternatively, the stiffeners 6 can also be arranged on an extrados face 40b or on both faces 40a, 40b of the spar 4 depending on the desired application.

The stiffeners 6 can be from two to twelve per spar 4. The stiffeners 6 are spaced apart from each other, for example in a regular (FIG. 3A) or random (FIG. 3B) manner.

Each stiffener 6 has a variable thickness per spar 4. For example, the stiffener 6 can have a thickness of between 2 and 5 mm, preferably between 3 and 4.5 mm. The thickness is measured in a direction parallel to the axis A, perpendicular to the axis B of the vane (FIG. 1).

The skin 5 of the blade can have a thickness between 2 and 5 mm, preferably between 3 and 4.5 mm.

Figure 4:
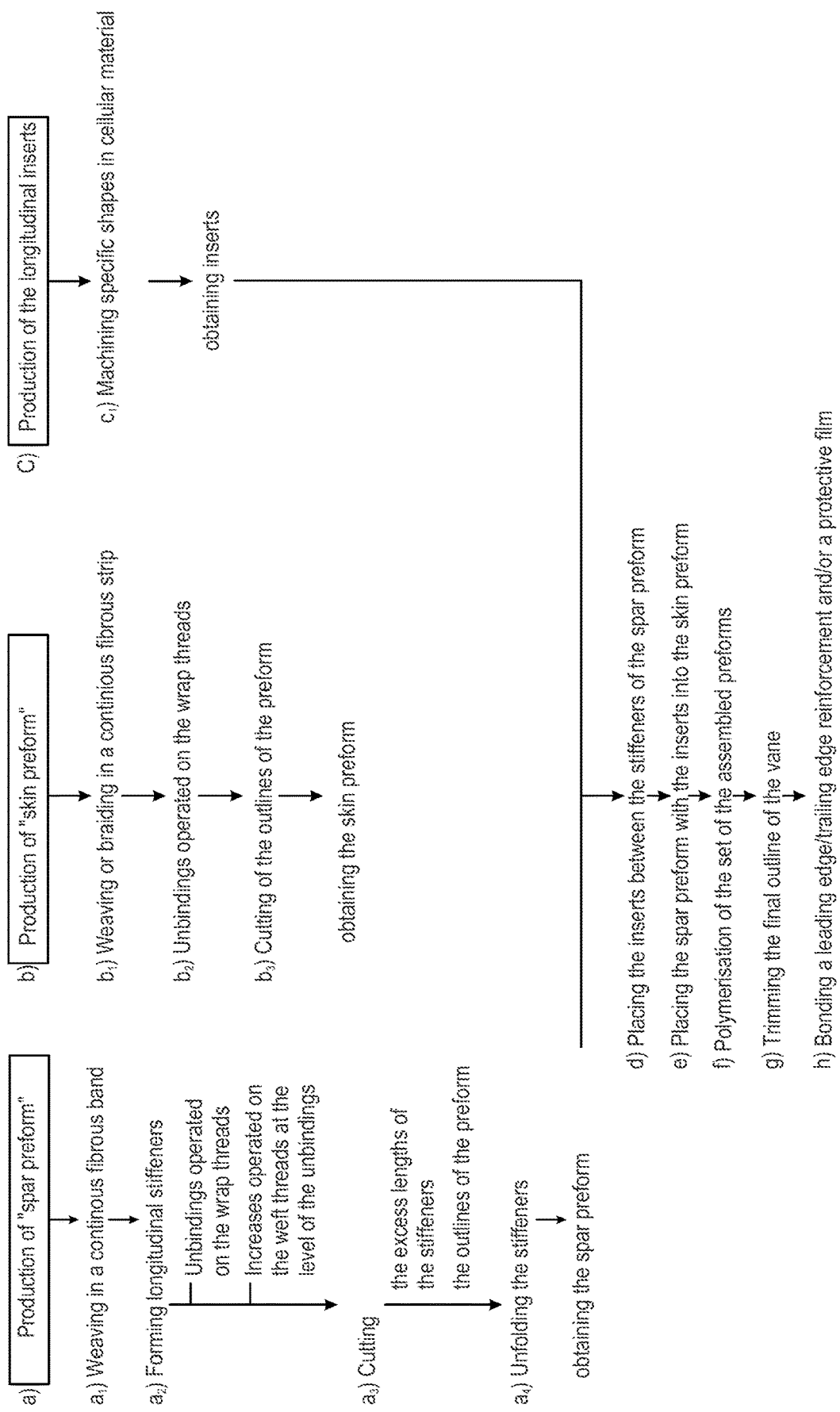
FIG. 4 shows successive steps of a method for manufacturing the vane of FIG. 1 according to the invention.

Successive steps of a manufacturing method for the vane 1 are for example summarized in FIG. 4.

In a step a), a fibrous spar preform 400 is obtained by 3D weaving.

Figure 5:
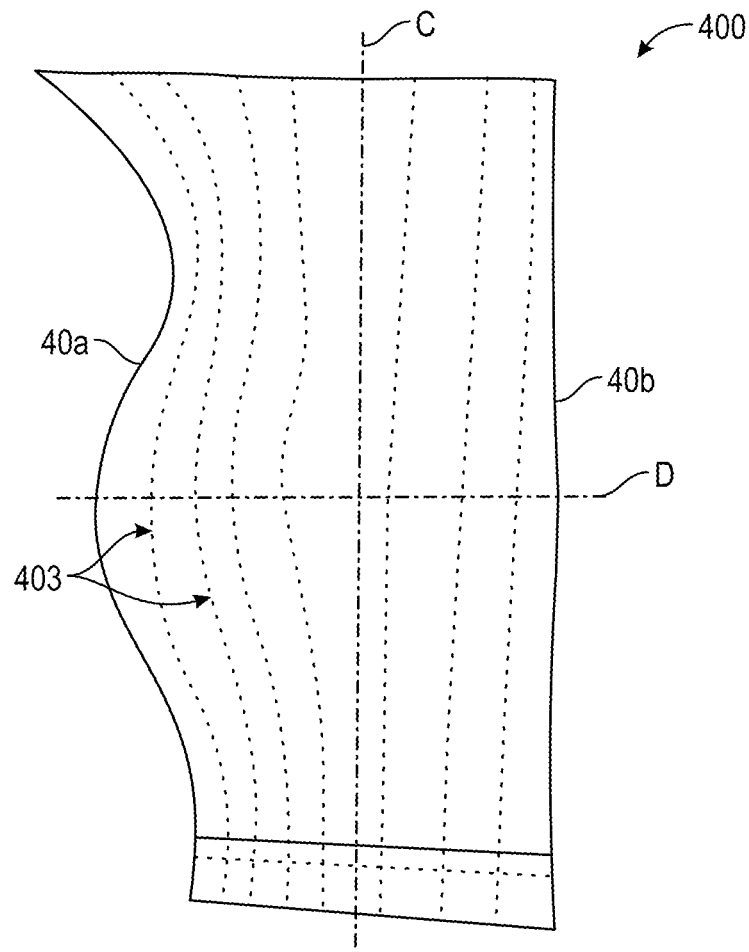
FIG. 5 is a schematic front view of a spar preform according to one of the manufacturing steps of FIG. 4.
Figure 6A:
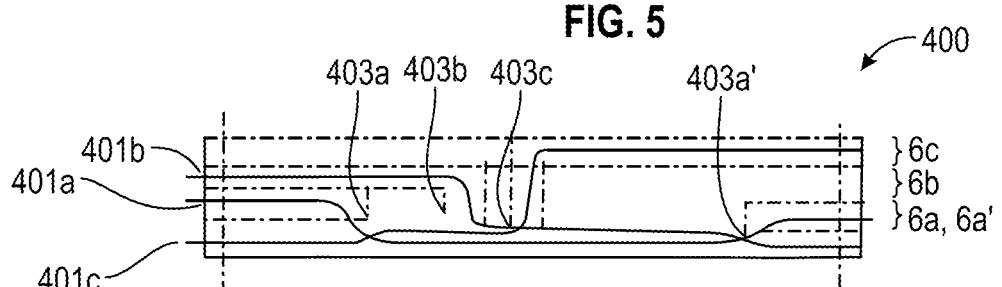
FIG. 6a is a schematic axial cross-sectional view of a spar preform along a horizontal plane D of FIG. 5, in which the stiffeners are folded.
Figure 6B:
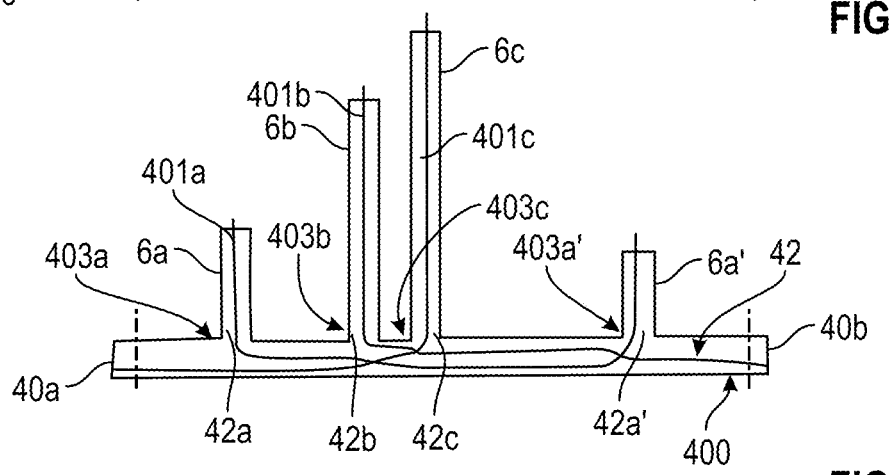
FIG. 6b is a schematic axial cross-sectional view of FIG. 6a in which the stiffeners are unfolded.
Figure 7:
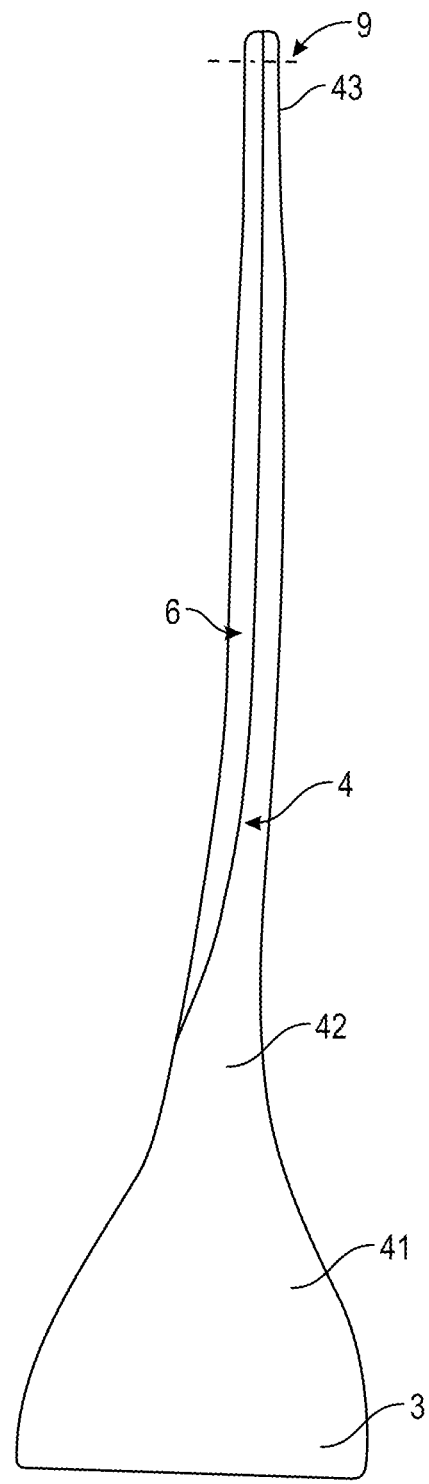
FIG. 7 is a schematic cross-section along a vertical plane C of the spar preform of FIG. 5.

FIGS. 5 to 7 show very schematically the fibrous preform 400 intended to form the spar 4 of the vane 1.

In a step a1), a 3D continuous fibrous strip weaving is produced to form the portion 42 of the spar preform. This portion 42 can be of constant or variable thickness.

The 3D weaving of the spar preform 400 is obtained by means of a jacquard-type loom on which a bundle of warp threads or strands has been arranged in a plurality of superimposed layers of several hundred threads each (not shown in the figures), the warp threads being bind by weft threads 401 (FIGS. 5a and 5b). Generally speaking, the warp threads are arranged perpendicular to the weft threads.

In the example shown, the 3D weaving is an interlock weaving pattern. By "interlock" weaving, we mean a weaving pattern in which each layer of weft threads binds several layers of warp threads with all the threads of a single weft column having the same movement in the plane of the pattern.

Other known types of 3D weaving can be used, such as in particular those described in the document WO-A2-2006/136755 of the applicant. This document describes in particular the realization by weaving in a single piece of fibrous reinforcement structures for parts such as vanes having a first type of core pattern and a second type of skin pattern which allow to confer at the same time the mechanical and aerodynamic properties expected for this type of part.

The preform 400 according to the invention can be woven from carbon fibre threads.

As the preform 400 is woven with varying thickness and width, a number of warp threads are not woven, thereby allowing to define the outline and desired, continuously varying thickness of the preform 400. An example of an evolving 3D weaving allowing in particular to vary the thickness of the preform between a first edge intended to form the leading edge and a second edge of a lesser thickness and intended to form the trailing edge is described in the document EP-A1-1 526 285 of the applicant.

More particularly, in a step a2) of the weaving, unbindings 403 are produced within the preform 400 between successive layers of warp threads. By unbinding, we mean an area that is not crossed by weft threads binding together successive layers of warp threads. Except at the level of the unbinding, the layers of warp threads are bind together by weft threads of one or a plurality of weft threads.

The unbindings 403 of the warp threads allow, on the one hand, to form the stiffeners 6 of the spar, and on the other hand to create spaces 8 between these stiffeners 6. These spaces 8 are configured to receive inserts 7 inside the vane blade.

More particularly, the spar preform is flat woven wherein after each warp thread unbinding, an increase in the weaving thickness of the weft threads is made, to form an overthickness at the level of this unbinding. By increase, we mean a localized area that is not crossed by weft threads binding together successive layers of warp threads. Each unbinding and overthickness allows thus to form a 3D woven stiffener.

At the end of the 3D weaving, the warp and weft threads are cut in a step a3), at the limit of the woven mass, to extract the spar preform represented on FIGS. 5 and 6a, as it is issued from the 3D weaving. For example, the excess lengths of the stiffeners and/or the outlines of the spar preform (e.g. leading/tailing edges), are cut out with a pressure water jet In a step a4), the thread unbindings allow to unfold the overthickness and thus to reveal the stiffeners on the spar preform represented on FIGS. 6b and 7.

It should be noted that a set of stiffeners per spar can be formed by different 3D weaving modes, in particular according to the choice of interlacing of the warp and weft threads, the number and the position of the stiffeners, in order to reinforce the mechanical strength of the stiffeners with the portion of the spar with respect to the desired dimension of the vane.

It should be noted that there are several possibilities for weaving the paths of the strands with respect to the weft threads to produce the portion 42 and the stiffeners 6 of the spar preform. Among the 3D weaving possibilities, the weaving path of the weft threads with respect to the strands can be either entering through a stiffener to pass through the portion of the spar preform and exiting, or entering through the portion of the spar preform and then exiting through a stiffener or entering through a stiffener and exiting through another stiffener after a passage through the portion of the spar preform. This allows to propose vanes with variable stiffeners depending on the desired size and stiffness of the vane.

For example, if all the weft threads enter through the spar portion, in particular on the side of the leading edge of the spar preform, and then exit through the stiffeners, the proportion of weft threads decreases towards the trailing edge of the preform. Conversely, if all the weft threads enter through the stiffeners and pass through the portion of the spar preform, the proportion of weft threads increases towards the trailing edge of the preform.

A non-exclusive 3D interlock pattern weaving mode of the preform 400 is shown very schematically in FIGS. 6a and 6b. In particular, four types of stiffeners 6a, 6b, 6c, 6a' formed by unbindings 403a, 403b, 403c, 403a' of the warp threads in the spar preform 400 are illustrated by FIGS. 6a and 6b. FIG. 6a shows the woven, unfolded stiffeners, while FIG. 6b shows the unfolded stiffeners. In the illustrated example, different weft threads bind warp threads to form the portion 42 of the spar, which has a constant thickness in the direction of the chord, and then unbindings 403a, 403b, 403c, 403a' of the warp threads are made at the level of four areas of the portion 42. At the level of each unbinding, increases in thickness are made by a weft thread 401a, 401b, 401c binding warp threads of the warp threads layers in the portion 42a, 42b, 42c, 42a' of the spar portion 42 adjacent to the unbinding 403a, 403b, 403c, 403a'. In particular, two stiffeners 6a, 6a' are woven by a first weft thread 401a entering through the stiffener 6a to pass through the portion 42 and exit through the stiffener 6a' (or vice versa). To do this, warp threads are added at the level of one of the unbindings 403a, 403a' so that the weft thread 401a can bind these warp threads with the warp threads of the warp thread layers of the portion 42a, 42a' of the spar, and produce the 3D weaving increases. Then, the stiffener 6b is woven by a second weft thread 401b entering through the stiffener 6b to pass through the portion 42 and exit through the trailing edge 40b of the spar preform. For this purpose, warp threads are also added at the level of the unbinding 403b so that the weft thread 401b can bind these warp threads with the warp threads of the warp thread layers of the portion 42b of the spar. According to the illustrated example, the stiffener 6c is woven by a third weft thread 401c entering through the leading edge 40a of the spar preform to pass through the portion 42 and exit through the stiffener 6c. To this end, the weft thread 401c binds the warp threads of the warp threads layers of the portion 42c of the spar to produce the weaving increases at the level of the unbinding 403c.

FIG. 7 illustrates the spar preform 400 in a front view extending radially from the end 41, through the portion 42, towards the opposite end 43 of the spar. Furthermore, the preform 400 comprises a vane root 3 added to the end 41 of the spar preform, and a vane head 9 fitted to the opposite end 43 of the spar preform.

A step b) of the manufacturing method allows to produce a fibrous skin preform (not shown separately in the figures) which is intended to form the aerodynamic profile of the vane blade.

In the same way as for the spar preform 400 described above, the skin preform can be obtained by 3D weaving made by means of a jacquard-type loom on which a bundle of warp threads has been arranged in a plurality of layers of several hundred threads each, the warp threads being bind by weft threads.

In a step b1), a 3D continuous fibrous strip weaving is made to form the skin preform.

In a step b2), an unbinding of the warp threads can be produced, for example at the level of the side of the trailing edge of the skin preform, so as to partially separate the intrados 50a and extrados 50b walls of the skin preform. In particular, this unbinding allows to facilitate the introduction of the portion 42 of the spar preform 400 inside this skin preform.

At the end of the 3D weaving, the warp and weft threads are cut in a step b3), for example with a pressurized water jet, at the limit of the woven mass to extract the desired skin preform.

Prior to shaping the vane, longitudinal inserts 7 are produced in a step c). These inserts 7 are configured to assemble into the spaces 8 for housing the spar preform 400.

In the step c1), inserts 7 may be machined to have shapes that match the shapes of the spaces 8 of the preform 400. These inserts 7 can be produced either directly by moulds having the shapes of the spaces 8 of housing, or by moulds of traditional form then these inserts are cut with the shapes corresponding to the spaces 8 of housing. The inserts can be made of honeycomb material so as not to significantly increase the overall weight of the vane. This honeycomb material can be unstructured (such as a Rohacell® polymer foam, an aluminium foam, etc.) or structured (such as a metal honeycomb or a polymer like Nomex®). The shape and the thickness of the inserts are chosen so as to facilitate their placement in the spar preform, without damaging the spar preform and without changing the final aerodynamic surface of the vane blade.

In a step d), the inserts 7 are arranged in the spaces 8 for housing the spar preform 400. Preferably, this step d) is performed manually by an operator. Tracers can be used to guide and control the correct positioning of the inserts in the housing spaces for the spar preform without changing the aerodynamic surface of the vane skin.

In a step e), the spar preform 400 integrating the longitudinal inserts 7 is assembled inside the skin preform, for example in a cavity formed by the unbinding of the threads of the skin preform.

Once the portion 42 of the spar preform 400 has been arranged in the skin preform, the fibrous preform thus formed is polymerized (or densified) in a step f). The trailing edge 20b of the skin preform, which is separated by an unbinding, is preferably resewn before the polymerization.

The polymerization of the fibrous preform can be made in a single operation, i.e. by polymerizing the spar and skin preforms at the same time, once assembled. In this case, these preforms are densified with a same polymerization resin (or matrix).

According to a variant embodiment of the invention, the spar preform can be polymerized alone with a first resin and then introduced into the skin preform as described above, the skin preform then being polymerized with a second resin which may be different from that of the first resin.

Furthermore, the spar and skin preforms can be made with threads made of fibres of the same or different nature.

The polymerization of the fibrous preform consists in filling the porosity of the preform, in all or part of its volume, by the material constituting the resin.

The resin of the composite material constituting the blade can be obtained by the technique of resin transfer moulding (RTM). In accordance with the RTM technique, the spar preform with the inserts arranged inside the skin preform, as explained above, is placed in a mould with the outer shape of the blade with aerodynamic profile. The mould comprising the assembled preforms is placed in an oven. A thermosetting resin is then injected into the mould. The resins suitable for the RTM techniques are well known, for example an epoxy resin. They preferably have a low viscosity to facilitate their injection into the fibres. The choice of the temperature of the oven and/or the chemical nature of the resin is determined according to the thermomechanical constraints to which the vane must be subjected. Once the resin is injected into the entire fibrous reinforcement of the preforms, it is polymerized by heat treatment in accordance with the RTM technique. After injection and polymerization, the vane is demoulded.

In a step g), the vane is trimmed to remove the excess resin and form the final outlines of the vane.

Finally, in a step h), a leading edge and/or trailing edge reinforcement can be bonded to the corresponding edges of the vane. A protective element 90 may be glued to the vane, such as a thermoplastic polyurethane film.

The different steps described above allow to obtain a fan vane 1 as shown on FIGS. 1 and 2. This vane 1 thus comprises a blade 2 with an aerodynamic profile made of composite material (fibrous reinforcement densified by a matrix), a spar 4 with stiffeners also made of composite material (fibrous reinforcement densified by a matrix) and inserts made of honeycomb material.

However, the invention is not limited to fan vane of a turbomachine and can be applied to other shrouded (fan) or unshrouded (propeller) vanes and movable (rotor) or stationary (stator) vanes of a turbomachine. The vane of the present invention can also be applied in the field of wind or water turbines and in the field of renewable energy.

The invention claimed is:

1. A fan or propeller vane for an aircraft turbomachine, the vane being made from composite material and comprising a blade and a root, the root being formed by a longitudinal end of a spar which is formed by a fibrous reinforcement formed of three-dimensionally woven threads and a portion of which extends inside the blade, said blade having an aerodynamic profile defined by a skin formed by woven threads and surrounding said portion of the spar, the spar and the skin being embedded in a polymerized resin, wherein said portion of the spar comprises protruding longitudinal stiffeners which delimit between them spaces for housing longitudinal inserts formed from a cellular material.

2. The vane according to claim 1, wherein each of the stiffeners is formed by an unbinding of threads of the spar.

3. The vane according to claim 1, wherein the transverse thickness of the spar decreases from the root towards the opposite end of the spar.

4. The vane according to claim 1, wherein the skin comprises an unbinding separating at least partially intrados and extrados walls of the blade.

5. The vane according to claim 4, wherein the unbinding separating at least partially intrados and extrados walls of the blade is at a level of a trailing edge of the skin.

6. The vane according to claim 1, wherein the stiffeners are arranged on an intrados face or an extrados face of the portion of the spar.

7. The vane according to claim 1, wherein the spar comprises between two and twelve stiffeners spaced from each other.

8. The vane according to claim 1, wherein each stiffener has a variable thickness.

9. The vane according to claim 8, wherein the thickness of each stiffener is between 2 and 5 mm.

10. The vane according to claim 1, wherein the end forming the root extends outside the skin.

11. The vane according to claim 1, wherein the vane comprises a protective element on one of the edges of the blade.

12. The vane according to claim 11, wherein the protective element is a thermoplastic polyurethane film.

13. The vane according to claim 1, wherein the cellular material of the longitudinal inserts is selected from a polymeric foam of the Rohacell® type, an aluminium foam, a metal honeycomb and/or a polymer of the Nomex® type.

14. The vane according to claim 1, wherein the stiffeners are inclined so as to form spaces of triangular or trapezoidal shape in axial cross-section.

15. The vane according to claim 1, wherein a thickness of the skin of the blade is between 2 and 5 mm.

16. The vane according to claim 1, wherein the spar comprises between six and twelve stiffeners spaced from each other.

17. The vane according to claim 1, wherein the at least one of the longitudinal stiffeners have in cross section a height greater than or equal to a width between two consecutive longitudinal inserts.

18. The vane according to claim 1, wherein the at least one of the longitudinal inserts is surrounded by at least two of the longitudinal stiffeners.

19. The vane according to claim 1, wherein each of the stiffeners is formed by an unbinding of threads of the spar.

20. A method for manufacturing a vane according to claim 1, the method comprising the steps of:
  a) producing a first fibrous preform, referred to as "spar preform", by three-dimensional weaving of threads; said preform comprising both a longitudinal end configured to form a vane root and a portion configured to be inserted inside a vane blade;
  b) producing a second fibrous preform, referred to as "skin preform", by three-dimensional weaving or braiding of threads; said skin preform being configured to form an aerodynamic profile;
  e) arranging the spar preform inside the skin preform;
  f) positioning said preforms in a mould, then injecting a thermosetting resin to obtain the vane;
  wherein the method comprises, prior to the steps e) and f), the steps consisting in:
  a2) forming in the step a) a plurality of longitudinal stiffeners on said portion of the spar, and delimiting spaces between the stiffeners,
  c) producing longitudinal inserts of cellular material, and
  d) inserting said inserts into said corresponding spaces of the spar preform.

* * * * *